July 14, 1970 D. O'BRYANT MILLER, JR 3,520,249
BUN TOASTER WITH THE ALUMINUM FOIL PROTECTIVE
SHEET IN FRONT OF THE HEATED PLATEN
Filed Dec. 11, 1968
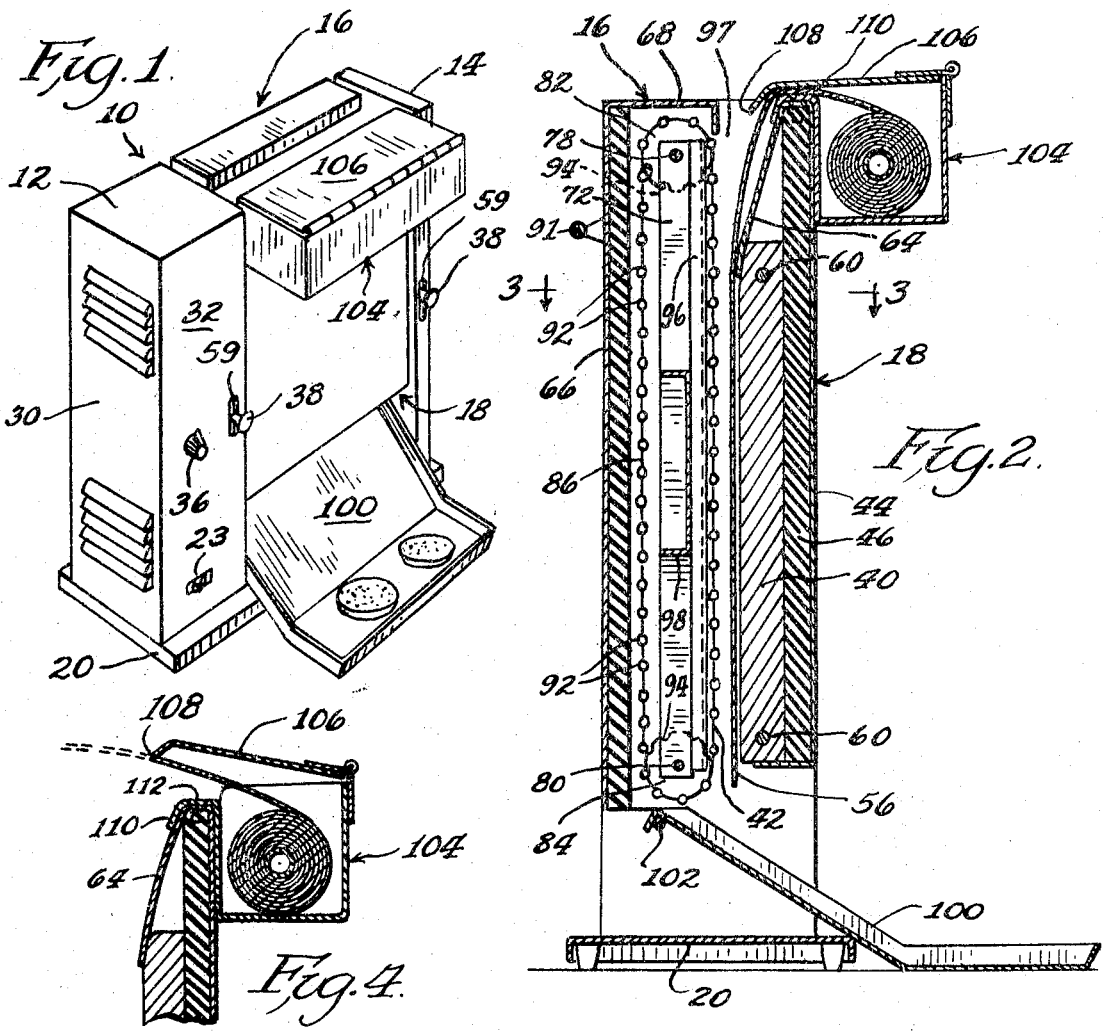
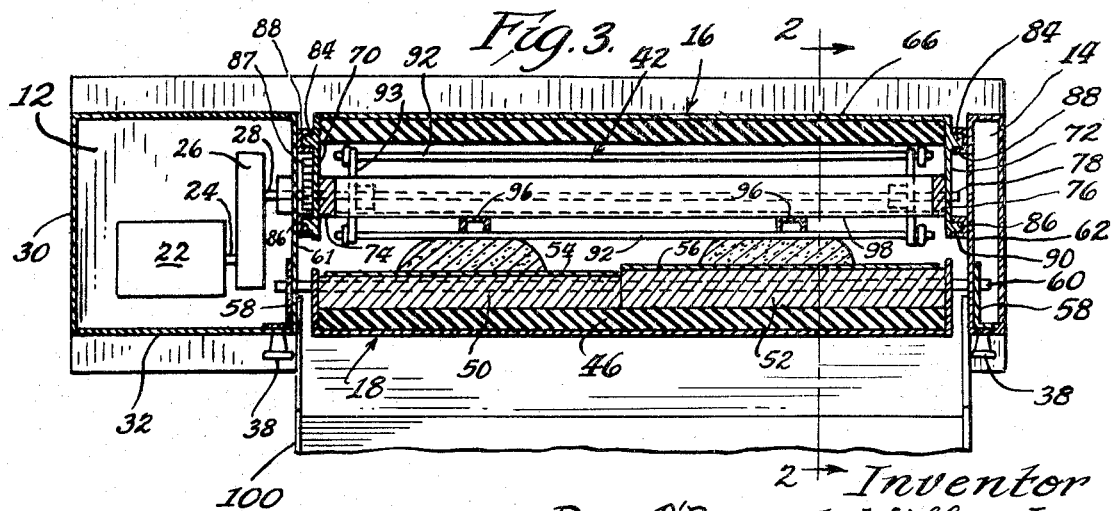
Inventor
Dye O'Bryant Miller, Jr.
By Mann, Brown & McWilliams
Attys.

3,520,249
BUN TOASTER WITH THE ALUMINUM FOIL
PROTECTIVE SHEET IN FRONT OF THE
HEATED PLATEN
Dye O'Bryant Miller, Jr., Mount Prospect, Ill., assignor to Mid-Continental Products Co., a corporation of Illinois
Filed Dec. 11, 1968, Ser. No. 782,870
Int. Cl. A47j 37/08
U.S. Cl. 99—357                                5 Claims

ABSTRACT OF THE DISCLOSURE

In order to prevent soiling of the heating platen of a bun toaster in which bun halves are conveyed past the heating platen while the halves are compressed between the platen and an endless conveyor, metal foil is placed between the platen and the bun halves so that the bun contacts the foil instead of the platen surface. A dispenser containing a roll of metal foil can be mounted at the top of the toaster and the foil can be allowed to remain attached to the roll until ready to be replaced by pulling a clean section of foil in front of the platen and severing the soiled section.

CROSS REFERENCES TO RELATED APPLICATIONS

This application is an improvement on the toaster described and claimed in application Ser. No. 757,931, filed Sept. 6, 1968, in the names of James R. Hirsch, Ralph E. Weimer, Dye O. Miller, Jr. and Frank F. Weiss, entitled "Bun Toaster."

BRIEF SUMMARY OF THE INVENTION

The heating platen in continuous bun toasters of the type shown and described in the above application Ser. No. 757,931 become soiled by the buns in contact therewith regardless of whether or not the buns are buttered and require frequent and extensive cleaning. In this type of bun toaster bun halves are fed into the throat at the top of the toaster and are moved downwardly by an endless conveyor between a heating platen and the conveyor. The distance between the platen and conveyor is such that the bun is slightly compressed against the platen and by reason of contact therewith soils the platen. This problem is overcome by the present invention in which a roll of aluminum or other suitable metal foil is hung on the top of the toaster in a dispenser and pulled down over the face of the platen so that instead of contacting the platen the bun contacts the surface of the foil. By heating the platen a little higher, for example, 20° F. above what it would otherwise be heated, suitable toasting is attained. As the foil surface becomes soiled a new section of foil is pulled in front of the platen and the soiled area severed from the roll.

BRIEF DESCRIPTION OF THE DRAWING

FIG. 1 is a perspective view of a toaster in accordance with the invention; FIG. 2 is a vertical sectional view of the toaster; FIG. 3 is a horizontal sectional view taken along the line 3, 3, of FIG. 2; and FIG. 4 is a fragmentary sectional view showing the foil and dispenser at the top of the toaster in the open position.

DETAILED DESCRIPTION OF THE INVENTION

Referring to the drawing, the numeral 10 indicates generally the toaster assembly including a compartment 12, a support column 14, a vertical conveyor assembly 16 and a vertical platen assembly 18. Compartment 12 and support column 14 are rigidly connected to pedestal 20 and together therewith constitute a frame for the conveyor assembly 16 and platen assembly 18.

Compartment 12 encloses and houses an electric motor 22 and connected to a suitable source of power which may be turned off and on by a conventional motor switch 23. The motor is mechanically coupled by means of coupling 24 to a suitable reducing gear box 26 which drives a shaft 28 on which is mounted a drive gear not shown. Motor 22 may be a variable speed motor whereby the speed of the conveyor to be described may be adjusted to vary toasting time. Compartment 12 has a vented end wall 30 in order to provide ventilation for the motor. Front wall 32 of compartment 12 has mounted thereon a control knob 34 for controlling a thermostat hooked up to the heating platen. Also mounted on wall 32 is one of two knobs 38 for adjusting the distance between the heating platen 40 and the conveyor 42.

Platen assembly 18 comprises an outer metal panel 44 and an insulating layer 46. The heating platen 40 is composed of sections 50 and 52. Section 52 is thicker than section 50 so that it lies closer to the conveyor. In this manner, the heel and the crown of a sliced bun can be toasted side by side at the same time. Ordinarily, the crown half of the bun is somewhat thicker than the heel portion and therefore the two sections of the platen are made of different widths to accommodate the two halves of the bun. The platen 40 has electric resistance elements imbedded therein for heating the toasting surfaces of the platen sections. Preferably the heating surfaces are treated with a non-stick coating such as a high temperature-resistant formulation of polytetrachlorethylene.

The platen assembly 18 is adjustably mounted on the frame by means of brackets 58 to which are attached threaded pins extending outwardly through vertically elongated openings 59 in the front of compartment 12 and column 14 and onto which are threaded the knobs 38. The heating platen assembly is hung on the frame by means of two rods 60, one near the top and the other near the bottom of the platen. The rod ends extend through elongated openings in the inner walls 61 and 62, of the compartment and column, respectively, and are adjustable toward and away from the conveyor by means of brackets 58 having slanted elongated openings through which the ends of the rods pass. The brackets are held in place by means of threaded pins passing through elongated openings 59 and onto which are threaded the knobs 38. By unloosening the knobs and raising or lowering the brackets 58 the platen can be adjusted. The platen section is encased in a trough-like metal panel or casing 44 made of stainless steel, chrome-plate steel or other suitable material. The top of casing terminates in a downwardly and inwardly sloping wall 64 terminating at the top and forward edge of the platen.

The conveyor assembly comprises an open box-like casing having a back 66, a top 68 and side walls 70 and 72. The insides of walls 70 and 72 have elongated bars 74 and 76 fastened thereto for rotatably supporting a pair of shafts 78 and 80 upon which the sprocket wheels 82 and 84 for the endless conveyor 86 are mounted. A gear 87 is mounted on the shaft 80 and engages the drive gear (not shown) on the gear box shaft 28.

The entire conveyor assembly can be readily removed from the toaster by reason of the fact that it is mounted by means of the lugs 84 and 86 in open top recesses or keyways 88 and 90; respectively. By lifting the conveyor section out of the recesses 88 and 90, the entire assembly can be lifted out of the frame by means of handle 91 and removed for cleaning or servicing.

The conveyor is preferably made of a plurality of rods 92 having end portions 93 bent at right angles and looped to interlock with the next preceding rod thereby to form a continuous web of equally spaced horizontally oriented rods which move in a direction normal to the axis of the rods and parallel to the platen heating surfaces. The horizontal portion of the rods engage in the sprockets 94 and move as an endless chain conveyor.

By reason of the fact that the rods 92 are relatively flexible, a pair of vertical back-up ribs 96 are provided which contact the back side of the rods which face the heating platen. These ribs provide support for the rods so that the bun halves are held firmly between the rods and the heating platen during their travel through the toaster. The ribs 96 are fastened to a connector web 98 which in turn is mounted between the bars 74 and 76.

The top of conveyor section 16 and the top of platen assembly 18 together define a trough-like entrance 97 to receive buns to be toasted, and to guide them to the confronting toasting surfaces and conveyor. As the bun halves are dropped into the trough they are fed to the constricted end of the trough by gravity and there slightly compressed between the downwardly moving conveyor 86 and the confronting platen sections. At the bottom of the toaster the bun portions drop onto a removable slide and holding pan 100 supported at its top by rod 102.

Mounted a the top of the platen section 18 is the foil dispenser 104 having hinged lid 106 with a downwardly sloping cutting edge 108. The dispenser 104 is formed with a bracket 110 shaped to fit on the top of the platen section casing 44. The bracket portion of the dispenser may be mounted on the top of the platen assembly in any suitable manner as, for example, by means of one or more screws 112 which are threaded into tapped holes in the top of the platen section. The dispenser 104 extends across the entire width of the platen so that it can accommodate a roll of aluminum foil at least equal in width to that of the platen.

In order to pull the foil down in front of the platen, the conveyor assembly is removed from the frame by lifting it off the recesses or keyways 88 and 90 and sliding the housing out of the rear of the frame. With the lid 106 of the dispenser 104 in open position, the foil is pulled out of the roll for a sufficient length to entirely cover the platen and is pulled down along the heating face of the platen as shown in FIG. 2. The lid 106 is then closed and the conveyor assembly replaced in the toaster frame. The toaster is now ready to operate. The operation will be like that described in the aforesaid application Ser. No. 757,931 except that the platen is heated about 20 degrees Fahrenheit higher than it would be without the aluminum foil in front of it in order to get sufficient heat to toast the buns or other bakery goods.

When the aluminum foil area protecting the platen becomes soiled so that it is desirable to replace it, the foil can either be pulled down over the platen after the lid 106 of the dispenser is opened and the soiled portion severed from the roll; or the toaster can be shut off and the conveyor assembly removed as before described and the soiled section severed from the roll by cutting it against the cutting edge 108 of the lid 106 after which another section of foil is pulled down in front of the heating platen and the toaster assembled for operation. Thus the foil can be renewed without exposing the platen and in fact the soiled portion of the foil can be replaced by fresh foil without interfering with the operation of the toaster.

By using foil in front of the platen, extensive cleaning of the platen is avoided and considerable saving in operating time is effected.

I claim:

1. A continuous toaster for bakery goods comprising an endless conveyor, a heating element juxtaposed with respect to said conveyor in a position to permit goods carried by said conveyor to pass between said heating element and conveyor in close propinquity to said heating element, means mounted on said toaster for dispensing metal foil, said means being mounted in a manner such that a portion of foil can be withdrawn from said dispenser and placed between said heating element and said conveyor without severing said foil from that remaining in the dispenser.

2. A continuous toaster in accordance with claim 1 in which the toaster has a housing, the heating element is mounted in one side of the housing, the conveyor is mounted in the opposite side of the housing, and the means for dispensing the metal foil is mounted on the same side of the housing as said heating element.

3. A continuous toaster in accordance with claim 2 in which the heating element is a platen.

4. A continuous toaster in accordance with claim 3 in which the conveyor is mounted in upright position, the platen is mounted in upright position, the housing has an opening at the top and bottom between said platen and conveyor through which bakery goods to be heated can be fed and withdrawn, respectively, and said dispensing means is mounted on the top side of said housing adjacent the opening at the top thereof.

5. A continuous toaster in accordance with claim 4 in which the dispensing means is a roll dispensing means formed with a bracket adapted to fit over the top of the platen side of the housing and fastened thereto.

References Cited

UNITED STATES PATENTS

| | | | |
|---|---|---|---|
| 784,854 | 3/1905 | Grace. | |
| 1,536,538 | 5/1925 | Stouffer | 99—386 |
| 1,538,864 | 5/1925 | Morrison | 99—387 |
| 2,032,272 | 2/1936 | Feltman | 99—386 |
| 2,533,080 | 12/1950 | Alexander | 99—443 |
| 2,788,735 | 4/1957 | Farace | 99—443 |

BILLY J. WILHITE, Primary Examiner

U.S. Cl. X.R.

99—386, 443

PO-1050
(5/69)

UNITED STATES PATENT OFFICE
CERTIFICATE OF CORRECTION

Patent No. 3,520,249                    Dated July 14, 1970

Inventor(s) Dye O'Bryant Miller, Jr.

It is certified that error appears in the above-identified patent and that said Letters Patent are hereby corrected as shown below:

Column 1, line 6, for "Mid-Continental" read -- Mid-Continent --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents